（12) United States Patent
Sweat et al.

(10) Patent No.: US 8,357,240 B2
(45) Date of Patent: *Jan. 22, 2013

(54) METHOD OF MAKING CONCRETE

(75) Inventors: Alan Sweat, Jasper, GA (US); Tricia G. Ladely, Beaver, PA (US); Kristen VanBuskirk, Aliquippa, PA (US)

(73) Assignee: SYNTHEON Inc., Moon Township, PA (US)

( * ) Notice: Subject to any disclaimer, the term of this patent is extended or adjusted under 35 U.S.C. 154(b) by 365 days.

This patent is subject to a terminal disclaimer.

(21) Appl. No.: 12/694,323

(22) Filed: Jan. 27, 2010

(65) Prior Publication Data

US 2010/0197818 A1 Aug. 5, 2010

Related U.S. Application Data

(60) Continuation-in-part of application No. 12/612,097, filed on Nov. 4, 2009, now Pat. No. 8,029,617, which is a division of application No. 11/387,198, filed on Mar. 22, 2006, now Pat. No. 7,644,548.

(60) Provisional application No. 61/150,147, filed on Feb. 5, 2009, provisional application No. 60/664,230, filed on Mar. 22, 2005, provisional application No. 60/686,858, filed on Jun. 2, 2005.

(51) Int. Cl.
*C04B 7/00* (2006.01)

(52) U.S. Cl. ......... 106/713; 106/644; 106/724; 106/737

(58) Field of Classification Search .................. 106/676, 106/677, 713, 724, 737, 644; 521/56
See application file for complete search history.

(56) References Cited

U.S. PATENT DOCUMENTS

| | | | |
|---|---|---|---|
| 3,021,291 A | 2/1962 | Thiessen | |
| 3,023,175 A | 2/1962 | Rodman, Jr. | |
| 3,214,393 A | 10/1965 | Sefton | |
| 3,257,338 A | 6/1966 | Sefton | |
| 3,272,765 A | 9/1966 | Sefton | |
| 3,547,412 A | 12/1970 | Klages et al. | |
| 3,869,295 A | 3/1975 | Bowles et al. | |
| 4,026,723 A | 5/1977 | Grof et al. | |
| 4,098,877 A | 7/1978 | Ball et al. | |
| 4,265,964 A | 5/1981 | Burkhart | |
| 4,298,394 A | 11/1981 | Leeming et al. | |
| 4,303,756 A | 12/1981 | Kajimura et al. | |
| 4,303,757 A | 12/1981 | Kajimura et al. | |
| 4,412,961 A | 11/1983 | DiBiasi et al. | |
| 4,518,550 A | 5/1985 | Miettinen et al. | |
| 4,725,632 A | 2/1988 | Vess | |
| 5,069,907 A | 12/1991 | Mixon et al. | |
| 5,211,751 A | 5/1993 | Arfaei et al. | |
| 5,238,749 A | 8/1993 | Cueman et al. | |
| 5,288,480 A | 2/1994 | Gaffar et al. | |
| RE35,194 E | 4/1996 | Gerber | |
| 5,580,378 A | 12/1996 | Shulman | |
| 5,586,643 A | 12/1996 | Zabron et al. | |
| 5,622,556 A | 4/1997 | Shulman | |
| 5,643,510 A | 7/1997 | Sucech | |
| 5,725,652 A | 3/1998 | Shulman | |
| 5,853,634 A | 12/1998 | Ontkean | |
| 5,913,791 A | 6/1999 | Baldwin | |
| 6,030,446 A | 2/2000 | Doty et al. | |
| 6,033,731 A | 3/2000 | Liebert et al. | |
| 6,080,796 A | 6/2000 | Liebert et al. | |
| 6,127,439 A | 10/2000 | Berghmans et al. | |
| 6,160,027 A | 12/2000 | Crevecoeur et al. | |
| 6,242,540 B1 | 6/2001 | Crevecoeur et al. | |
| 6,800,129 B2 | 10/2004 | Jardine et al. | |
| 6,833,188 B2 | 12/2004 | Semmens | |
| 6,851,235 B2 | 2/2005 | Baldwin | |
| 6,908,949 B2 | 6/2005 | Arch et al. | |
| 6,969,423 B2 | 11/2005 | Li et al. | |
| 7,648,574 B2 * | 1/2010 | Guevara et al. | 106/672 |
| 8,029,617 B2 * | 10/2011 | Guevara et al. | 106/713 |
| 2002/0117769 A1 | 8/2002 | Arch et al. | |
| 2003/0024441 A1 | 2/2003 | Shimoyama et al. | |

(Continued)

FOREIGN PATENT DOCUMENTS

EP 0 652 188 5/1995

(Continued)

OTHER PUBLICATIONS

Dipl.-Ing. Thorsten et al., High Strength Lightweight-Aggregate Concrete; 2nd Int. PhD Symposium in Civil Engineering, 1998 Budapest, pp. 1-8.

The use of Styrocell B Beads in Cellular Bricks, Plaster and Lightweight Concrete; Shell Chemicals Europe, Styrocell Bulletin, STY 1.4, Issued: Mar. 1998, 1st Edition, pp. 1-8.

Sabaa, B.A., and Sri Ravindrarajah, R., "Controlling freeze and thaw durability of structural grade concrete with recycled expanded aggregate", Proceedings of the Second International Symposium on Structural Lightweight Aggregate Concrete, Jun. 18-22, 2000, Kristiansand, Norway, pp. 709-718.

Sri Ravindrarajah, R. and Tuck, A.J., "Properties of polystyrene aggregate concrete", Proc. of the 13th Australasian Conf. on the Mechanics of Structures & Materials, Jul. 5-6, 1993, Wollongong, Australia, pp. 705-712.

(Continued)

*Primary Examiner* — Paul Marcantoni
(74) *Attorney, Agent, or Firm* — Gary F. Matz

(57) ABSTRACT

A method of preparing a light weight concrete composition using expanded polymer particles that includes a) replacing from about 10 to about 50 volume percent of the coarse aggregate in the concrete composition with prepuff particles; and b) preparing the concrete composition by combining ingredients comprising 3-40 volume percent cement, 1-50 volume percent fine aggregate, 0-40 volume percent coarse aggregate, 10-22 volume percent water, and 5-40 volume percent of prepuff particles. The prepuff particles have an average particle diameter of from 0.2 mm to 5 mm, a bulk density of from 0.02 g/cc to 0.56 g/cc, an aspect ratio of from 1 to 3. The concrete composition has a density of from about 90 to about 135 lb./ft$^3$ and after it is set for 28 days, has a compressive strength of at least 1800 psi as tested according to ASTM C39.

13 Claims, No Drawings

U.S. PATENT DOCUMENTS

| | | | |
|---|---|---|---|
| 2004/0065034 A1 | 4/2004 | Messenger et al. | |
| 2004/0231916 A1 | 11/2004 | Englert et al. | |
| 2006/0217464 A1 | 9/2006 | Guevara et al. | |
| 2006/0225618 A1 | 10/2006 | Guevara et al. | |
| 2007/0062415 A1 | 3/2007 | Guevara et al. | |
| 2008/0058446 A1* | 3/2008 | Guevara et al. ................. | 524/2 |
| 2008/0275149 A1* | 11/2008 | Ladely et al. ................... | 521/55 |
| 2009/0078161 A1* | 3/2009 | Woolfsmith et al. ......... | 106/692 |
| 2009/0081446 A1* | 3/2009 | Woolfsmith et al. ......... | 428/323 |
| 2010/0098524 A1* | 4/2010 | Guevara et al. ............... | 414/812 |
| 2010/0273902 A1* | 10/2010 | Ladely et al. ................... | 521/55 |

FOREIGN PATENT DOCUMENTS

| | | |
|---|---|---|
| FR | 2 539 410 A1 | 7/1984 |
| JP | 90/71449 | 3/1997 |
| WO | 98/02397 | 1/1998 |
| WO | 00/02826 | 1/2000 |
| WO | 00/61519 | 10/2000 |
| WO | 01/66485 | 9/2001 |

OTHER PUBLICATIONS

Sri Ravindrarajah, R. and Tuck, A.J. "Properties of Hardened Concrete Containing Treated Expanded Polystyrene Beads", Int. J. of Cement Composites, V 16, Dec. 1994, pp. 273-277.

Sri Ravindrarajah, R. and Sivapathasundaram, P., "Properties of Polystyrene Aggregate Concrete Having the Densities of 1300 and 1900 kg/m3", Journal of the Australian Ceramic Society, 1998, pp. 217-222.

Sri Ravindrarajah, R., "Bearing Strength of Concrete Containing Polystyrene Aggregate", Proceedings of the 8th RILEM Conference on the Durability of Building Materials & Components, Vancouver, Canada, 1999, pp. 505-514.

Sabaa, B.A., and Sri Ravindrarajah, R., "Investigation of Pull-Out Strength Between Polystyrene Aggregate Concrete and Reinforcing Steel", Proceedings of the Second International Symposium on Structural Lightweight Aggregate Concrete, Jun. 18-22, 2000, Kristiansand, Norway, pp. 729-736.

Sabaa, B.A., and Sri Ravindrarajah, R., "Impact Resistance of Polystyrene Aggregate Concrete With and Without Polypropylene Fibres", Proceedings of the Second International Symposium on Structural Lightweight Aggregate Concrete, Jun. 18-22, 2000, Kristiansand, Norway, pp. 719-728.

Naji, B., Sri Ravindrarajah, R. and Chung, H.W., "Flexural Behaviour of Ferrocement-Polystyrene Aggregate Concrete Composites", Proc. of the First Australasian Congress on Applied Mechanics, Feb. 21-23, 1996, Melbourne, Australia, pp. 351-356.

Naji, B., Sri Ravindrarajah, R. and Chung, H.W., "Impact-Echo Response in Ferrocement-Polystyrene Beaded Concrete Laminates", Proc. of the Int. Symp. on Non-Destructive Testing in Civil Engineering, Sep. 26-28, 1995, Berlin, Germany, pp. 503-511.

Sri Ravindrarajah, R. and Sivakumar, R., "Effect of Polystyrene Particle Shape on the Properties of Lightweight Aggregate Concrete", Proceedings of the South African Conference on Polymers in Concrete, Jul. 2000, Kruger National Park, South Africa, pp. 195-203.

Sabaa, B.A., and Sri Ravindrarajah, R., "Compressive and Tensile Strength of "Adjusted Density" Concrete Using Expanded Polystyrene Aggregate", Proceedings of the South African Conference of Polymers in Concrete, Jul. 2000, Kruger National Park, South Africa, pp. 133-141.

* cited by examiner

METHOD OF MAKING CONCRETE

REFERENCE TO RELATED APPLICATION

This application claims the benefit of priority of U.S. Provisional Application Ser. No. 61/150,147 filed Feb. 5, 2009 entitled "Method of Making Concrete" and is a continuation in part of application Ser. No. 12/612,097, now U.S. Pat. No. 8,029,617, filed Nov. 4, 2009 as a division of application Ser. No. 11/387,198, now U.S. Pat. No. 7,644,548, filed Mar. 22, 2006, both entitled "Lightweight Concrete Compositions", which claim the benefit of priority of U.S. Provisional Application Ser. Nos. 60/664,230 filed Mar. 22, 2005 entitled "Light Weight Concrete Composite Using EPS Beads" and 60/686,858 filed Jun. 2, 2005 entitled "Lightweight Compositions and Materials," which are all herein incorporated by reference in their entirety.

BACKGROUND OF THE INVENTION

1. Field of the Invention

The present invention is directed to novel compositions, materials, methods of their use and methods of their manufacture that are generally useful as agents in the construction and building trades. More specifically, the methods and compositions of the present invention can be used in construction and building applications that benefit from concrete compositions having structural strength properties and less than normal weight.

2. Description of the Prior Art

Expanded polymers have been incorporated into concrete formulations for the purpose of lowering the density or weight of the final cured and hardened concrete. Past practice has been to replace the fine aggregate or sand portion of a concrete mix with expanded polymers; however, this approach, while providing concrete with a lower weight or density, does not provide concrete with the physical properties required for structural applications.

U.S. Pat. Nos. 3,214,393; 3,257,338; 3,272,765; 4,040,855; 4,265,964; 5,472,498; 5,580,378; 5,622,556; 5,725,652; and 6,875,266 are non-limiting examples where the density of concrete has been reduced by replacing coarse aggregate with expandable polystyrene (EPS).

Accepted practice in the concrete industry to improve concrete strength in various mix designs is to reduce the water content in the mix. However, a decrease in the proportion of coarse aggregate to fine aggregate increases the water demand in a concrete mix. When strength is to be maximized, the amount of coarse aggregate is maintained at high levels (see generally, Kosmatka et al., Design and Control of Concrete Mixtures, Fourteenth Edition, Portland Cement Association, 2002, pages 2 and 155).

There remains a need in the art to provide light weight concrete formulations using expanded polymers that also possess the physical properties to be used in structural applications.

SUMMARY OF THE INVENTION

The present invention provides a method of preparing a light weight concrete composition using expanded polymer particles that includes a) replacing from about 10 to about 50 volume percent of the coarse aggregate in the concrete composition with prepuff particles; and b) preparing the concrete composition by combining ingredients comprising 3-40 volume percent cement, 1-50 volume percent fine aggregate, 0-40 volume percent coarse aggregate, 10-22 volume percent water, and 5-40 volume percent of prepuff particles. The prepuff particles have an average particle diameter of from 0.2 mm to 5 mm, a bulk density of from 0.02 g/cc to 0.56 g/cc, an aspect ratio of from 1 to 3. The concrete composition has a density of from about 90 to about 135 lb./ft$^3$ and after it is set for 28 days, has a compressive strength of at least 1800 psi as tested according to ASTM C39.

DETAILED DESCRIPTION OF THE INVENTION

Other than in the operating examples or where otherwise indicated, all numbers or expressions referring to quantities of ingredients, reaction conditions, etc. used in the specification and claims are to be understood as modified in all instances by the term "about". Accordingly, unless indicated to the contrary, the numerical parameters set forth in the following specification and attached claims are approximations that can vary depending upon the desired properties, which the present invention desires to obtain. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical values, however, inherently contain certain errors necessarily resulting from the standard deviation found in their respective testing measurements.

Also, it should be understood that any numerical range recited herein is intended to include all sub-ranges subsumed therein. For example, a range of "1 to 10" is intended to include all sub-ranges between and including the recited minimum value of 1 and the recited maximum value of 10; that is, having a minimum value equal to or greater than 1 and a maximum value of equal to or less than 10. Because the disclosed numerical ranges are continuous, they include every value between the minimum and maximum values. Unless expressly indicated otherwise, the various numerical ranges specified in this application are approximations.

As used herein the terms "cement" and "cementitious" refer to materials that bond a concrete or other monolithic product, not the final product itself. In particular, hydraulic cement refers to a material that sets and hardens by undergoing a hydration reaction in the presence of a sufficient quantity of water to produce a final hardened product. As used herein, unless otherwise noted, concrete that includes cement or cementitious materials can optionally include supplementary cementitious materials.

As used herein, the term "coarse aggregate" refers to one or more solid materials, including without limitation river rock, limestone, granite, sandstone, brownstone, conglomerate, calcite, dolomite, serpentine, travertine, slate, bluestone, gneiss, quarizitic sandstone, and/or quartzite having a fineness modulus (FM) value of greater than 4.

As used herein, the term "concrete" refers to a hard strong building material made by mixing a cementitious composition with sufficient water to cause the cementitious composition to set and bind the entire mass.

As used herein, the term "concrete composition" refers to a composition that includes a cementitious composition, and one or more fillers, adjuvants, or other aggregates and/or materials known in the art that form a slurry that hardens upon curing. Cementitious compositions include, but are not limited to, hydraulic cement, gypsum, gypsum compositions, lime, supplementary cementitious materials and the like to which water may be added. Adjuvants and fillers include, but are not limited to sand, clay, fly ash, aggregate, air entrainment agents, colorants, water reducers/superplasticizers, and the like.

As used herein, the term "continuous outer layer" refers to the generally smooth continuous polymeric surface of the prepuff particles used in the present invention.

As used herein, the term "Crossover Point" refers to a composition identified when comparing two series of mix designs on a graph using 28-day compressive strength in psi on the y-axis and density in pcf on the x-axis, one made up by maintaining coarse aggregate at a constant volume percentage (CV) while adjusting the amount of fine aggregate and prepuff particles to achieve different densities and the other made up by maintaining a constant fine aggregate to total aggregate ratio (CR) while changing the concrete density by changing the amount of prepuff particles and fine and coarse aggregate at the selected ratio. The "Crossover Point" is the density where the CV and CR trend lines intersect.

As used herein, the term "expansion factor" refers to the volume a given weight of expanded polymer bead occupies, typically expressed as cc/g, and in the present invention, typically a value of up to 50 cc/g.

As used herein, "fineness modulus" or "FM" refers to an empirical factor that gives a relative measure of the proportions of fine and coarse particles in an aggregate. FM is a value used to indicate the relative fineness or coarseness of a fine aggregate and can be determined according to ASTM C 117. Although ASTM C 117 can be consulted for precise details, and is incorporated by reference herein in its entirety, it can be summarized as follows. The FM is obtained by sieving a 500-gram sample of sand through a series of standard sieves (Nos. 4, 8, 16, 30, 50, and 100). The weight retained on each sieve is converted into a cumulative percentage retained, starting with the No. 4 sieve. The sum of the six percentages is divided by 100. The resulting answer is the fineness modulus.

As used herein, "light weight aggregate" refers to prior art inorganic materials for reducing the density or weight of a concrete formulation that include, without limitation, pumice, perlite, vermiculite, scoria, diatomite, expanded shale, expanded slate, expanded clay, expanded slag, pelletized aggregate, extruded fly ash, tuff, macrolite, sintered fly ash, coal cinders, and pelletized aggregate.

As used herein, the term "particles containing void spaces" refer to expanded polymer particles, prepuff particles, and other particles that include cellular and/or honeycomb-type chambers at least some of which are completely enclosed, that contain air or a specific gas or combination of gasses, as a non-limiting example prepuff particles as described herein.

As used herein, the term "prepuff particles" refers to expanded polymer particles that have been expanded, but not to their maximum expansion factor.

As used herein, the term "ready mix" refers to concrete that is batched for delivery from a central plant instead of being mixed on a job site. Typically, a batch of ready mix is tailor-made according to the specifics of a particular construction project and delivered in a plastic condition, usually in cylindrical trucks often referred to as "concrete mixers".

All compositional ranges expressed herein are limited in total to and do not exceed 100 percent (volume percent or weight percent) in practice. Where multiple components can be present in a composition, the sum of the maximum amounts of each component can exceed 100 percent, with the understanding that, and as those skilled in the art readily understand, that the amounts of the components actually used will conform to the maximum of 100 percent.

As used herein, the terms "(meth)acrylic" and "(meth)acrylate" are meant to include both acrylic and methacrylic acid derivatives, such as the corresponding alkyl esters often referred to as acrylates and (meth)acrylates, which the term "(meth)acrylate" is meant to encompass.

As used herein the term "light weight concrete" refers to a concrete composition having a density of less than 140 lb/ft$^3$ (2.25 g/cc).

As used herein the term "normal weight concrete" refers to a concrete composition that does not contain expanded polymer particles or light weight aggregate, having a density of at least 140 lb/ft$^3$ (2.25 g/cc).

As used herein, the term "polymer" is meant to encompass, without limitation, homopolymers, copolymers, graft copolymers, and blends and combinations thereof.

As used herein, the terms "supplementary cementitious material" or "pozzolan" refer to a siliceous or siliceous and aluminous material, which in itself possesses little or no cementitious value, but which will in finely divided form and in the presence of moisture, chemically react with calcium hydroxide at ordinary temperatures to form compounds possessing cementitious properties. Non-limiting examples of supplementary cementitious materials or pozzolans include fly ash (C and F), silica fume, micronized silica, condensed silica fume, volcanic ashes, calcined clay, metakaolin clay, calcined shale and ground granulated blast furnace slag.

The methods and compositions according to the present invention provide concrete compositions that provide reduced weight or density while providing physical properties suitable for application in various load bearing and structural applications.

In the present invention, light weight concrete composition using expanded polymer particles are made by replacing from about 10 to about 50 volume percent of the coarse aggregate in the concrete composition with prepuff particles. The concrete compositions are prepared by combining ingredients comprising 3-40 volume percent cement, 1-50 volume percent fine aggregate, 0-40 volume percent coarse aggregate, 10-22 volume percent water, and 5-40 volume percent of prepuff particles.

The concrete compositions of the present method can include coarse aggregate (aggregate having an FM value of greater than 4). In embodiments of the invention, the coarse aggregate can have a diameter of from at least about 0.375 inches (0.95 cm), in some cases, about 0.5 inches (1.3 cm), and, in other cases, about 0.75 inches (1.9 cm) to up to about 2 inches (5 cm). The coarse aggregate can include stone, non-limiting examples of which include river rock, limestone, granite, sandstone, brownstone, conglomerate, calcite, dolomite, serpentine, travertine, slate, bluestone, gneiss, quarizitic sandstone, quartzite and combinations thereof.

The optional coarse aggregate can be included in the concrete composition of the present method at a level of from 0-40 volume percent, and when included can be present at a level of from at least 1, in some cases, at least 3, and, in other cases, at least 5 volume percent of the concrete composition. Further, coarse aggregate can provide up to 40, in some situations up to 35, in other situations up to 30, in some cases up to 25, in other cases, up to 20, in some instances up to 15, and, in other instances up to 10 volume percent of the concrete composition of the present method. The amount of coarse aggregate is adjusted to provide desired properties to the concrete composition of the present method. The amount of coarse aggregate in the concrete composition of the present method can be any value or range between any of the values recited above.

Compared to normal weight, the concrete compositions of the present invention replace at least some of the coarse aggregate with expanded polymer particles and have a lower density (less than 140 lb/ft$^3$) but provide sufficient strength for structural applications and avoid the water uptake and slump loss problems encountered with light weight aggregate.

The prepuff or expanded polymer particles are present in the concrete composition of the present method at a level of at least 5, in some instances, at least 10, and, in other instances, at least 15 volume percent and up to 40, in some cases, up to 35, in other cases, up to 30, and, in some instances, up to 25 volume percent based on the total volume of the concrete composition of the present method. The amount of expanded polymer particles will vary depending on the particular physical properties desired in a finished concrete article, as non-limiting examples, concrete density, concrete strength, concrete relative humidity, and/or concrete moisture vapor emission rates. The amount of expanded polymer particles in the concrete composition of the present method can be any value or can range between any of the values recited above.

The expanded polymer particles can include any particles derived from any suitable expandable thermoplastic material. The actual polymer particles are selected based on the particular physical properties desired in a finished concrete article. As a non-limiting example, the polymer particles, which can optionally be expanded polymer particles, can include one or more polymers selected from homopolymers of vinyl aromatic monomers; copolymers of at least one vinyl aromatic monomer with one or more of divinylbenzene, conjugated dienes, alkyl methacrylates, alkyl acrylates, acrylonitrile, and/or maleic anhydride; polyolefins; polycarbonates; polyesters; polyamides; natural rubbers; synthetic rubbers; and combinations thereof.

In an embodiment of the invention, the polymer particles include thermoplastic homopolymers or copolymers selected from homopolymers derived from vinyl aromatic monomers including styrene, isopropylstyrene, alpha-methylstyrene, nuclear methylstyrenes, chlorostyrene, tert-butylstyrene, and the like, as well as copolymers prepared by the copolymerization of at least one vinyl aromatic monomer as described above with one or more other monomers, non-limiting examples being divinylbenzene, conjugated dienes (non-limiting examples being butadiene, isoprene, 1,3- and 2,4-hexadiene), alkyl methacrylates, alkyl acrylates, acrylonitrile, and maleic anhydride, wherein the vinyl aromatic monomer is present in at least 50% by weight of the copolymer. In an embodiment of the invention, styrenic polymers are used, particularly, polystyrene; however, other suitable polymers can be used, such as, polyolefins (e.g. polyethylene, polypropylene), polycarbonates, polyphenylene oxides, and mixtures thereof.

In a particular embodiment of the invention, the expanded polymer particles are expanded polystyrene (EPS) particles. These particles can be in the form of beads, granules, or other particles convenient for expansion and molding operations.

In embodiments of the present invention, particles are formed via polymerization in a suspension process, which are essentially spherical resin beads. These beads can be used to form expanded polymer particles; however, polymers derived from solution and bulk polymerization techniques that are extruded and cut into particle sized resin bead sections can also be used.

In an embodiment of the invention, resin beads (unexpanded) containing any of the polymers or polymer compositions described herein have a particle size of at least 0.2, in some situations, at least 0.33, in some cases, at least 0.35, in other cases, at least 0.4, in some instances, at least 0.45 and, in other instances, at least 0.5 mm. Also, the resin beads can have a particle size of up to 2, in some instances, up to 1.9, in other instances, up to 1.8, in some cases, up to 1.7, in other cases, up to 1.6, in some situations, up to 1.5 and, in other situations, up to 1 mm. In this embodiment, the physical properties of concrete articles made according to the present method have inconsistent or undesirable physical properties when resin beads having particle sizes outside of the above described ranges are used to make the expanded polymer particles. The resin beads used in this embodiment can be any value or can range between any of the values recited above.

The expandable thermoplastic particles or resin beads can be impregnated using any conventional method with a suitable blowing agent. As a non-limiting example, the impregnation can be achieved by adding the blowing agent to the aqueous suspension during the polymerization of the polymer, or alternatively by re-suspending the polymer particles in an aqueous medium and then incorporating the blowing agent as taught in U.S. Pat. No. 2,983,692. Any gaseous material or material which will produce gases on heating can be used as the blowing agent. Conventional blowing agents include aliphatic hydrocarbons containing 4 to 6 carbon atoms in the molecule, such as, butanes, pentanes, hexanes, and the halogenated hydrocarbons, e.g., CFC's and HCFC's, which boil at a temperature below the softening point of the polymer chosen. Mixtures of these aliphatic hydrocarbon blowing agents can also be used.

Alternatively, water can be blended with these aliphatic hydrocarbons blowing agents or water can be used as the sole blowing agent as taught in U.S. Pat. Nos. 6,127,439; 6,160,027; and 6,242,540. In these patents, water-retaining agents are used. The weight percentage of water for use as the blowing agent can range from 1 to 20%. The texts of U.S. Pat. Nos. 6,127,439, 6,160,027 and 6,242,540 are incorporated herein by reference.

The impregnated polymer particles or resin beads are expanded to a bulk density of at least 1.25 lb/ft$^3$ (0.02 g/cc), in some cases, at least 1.75 lb/ft$^3$ (0.028 g/cc), in other cases, at least 2 lb/ft$^3$ (0.032 g/cc) in some circumstances, at least 3 lb/ft$^3$ (0.048 g/cc) and, in other circumstances, at least 3.25 lb/ft$^3$ (0.052 g/cc) or 3.5 lb/ft$^3$ (0.056 g/cc). The bulk density can be up to 35 lb/ft$^3$ (0.56 g/cc), in some cases, up to 30 lb/ft$^3$ (0.48 g/cc), in other cases, up to 25 lb/ft$^3$ (0.4 g/cc), in some instances, up to 20 lb/ft$^3$ (0.32 g/cc), in other instances, up to 15 lb/ft$^3$ (0.24 g/cc) and, in certain circumstances, up to 10 lb/ft$^3$ (0.16 g/cc). The bulk density of the polymer particles can be any value or range between any of the values recited above. The bulk density of the expanded polymer particles and/or prepuff particles is determined by weighing a known volume of polymer particles, beads and/or prepuff particles (aged 24 hours at ambient conditions).

The expansion step is conventionally carried out by heating the impregnated beads via any conventional heating medium, such as, steam, hot air, hot water, or radiant heat. One generally accepted method for accomplishing the pre-expansion of impregnated thermoplastic particles is taught in U.S. Pat. No. 3,023,175.

The expanded polymer particles can be foamed cellular polymer particles as taught in U.S. Patent Application Publication No. 2002/0117769, the teachings of which are incorporated herein by reference. The foamed cellular particles can be polystyrene that are expanded and contain a volatile blowing agent at a level of less than 14 wt. %, in some situations less than 6 wt. %, in some cases ranging from about 2 wt. % to about 5 wt. %, and in other cases ranging from about 2.5 wt. % to about 3.5 wt. % based on the weight of the polymer.

An interpolymer of a polyolefin and in situ polymerized vinyl aromatic monomers that can be included in the expanded thermoplastic resin or polymer particles, according to the invention, is disclosed in U.S. Pat. Nos. 4,303,756, 4,303,757 and 6,908,949, the relevant portions of which are herein incorporated by reference.

The polymer particles can include customary ingredients and additives, such as, flame retardants, pigments, dyes, colorants, plasticizers, mold release agents, stabilizers, ultraviolet light absorbers, mold prevention agents, antioxidants, rodenticides, insect repellants, and so on. Typical pigments include, without limitation, inorganic pigments, such as, carbon black, graphite, expandable graphite, zinc oxide, titanium dioxide, and iron oxide, as well as, organic pigments, such as, quinacridone reds and violets and copper phthalocyanine blues and greens.

In a particular embodiment of the invention, the pigment is carbon black, a non-limiting example of such a material being EPS SILVER® resin, available from NOVA Chemicals Inc.

In another particular embodiment of the invention the pigment is graphite, a non-limiting example of such a material being NEOPOR® resin available from BASF Aktiengesellschaft Corp., Ludwigshafen am Rhein, Germany.

When materials such as carbon black and/or graphite are included in the polymer particles, improved insulating properties, as exemplified by higher R values for materials containing carbon black or graphite (as determined using ASTM-C518), are provided. As such, the R value of the expanded polymer particles containing carbon black and/or graphite or materials made from such polymer particles are at least 5% higher than observed for particles or resulting articles that do not contain carbon black and/or graphite.

The expanded polymer particles or prepuff particles can have an average particle size (diameter) of at least 0.2, in some circumstances, at least 0.3, in other circumstances, at least 0.5, in some cases, at least 0.75, in other cases, at least 0.9 and, in some instances, at least 1 mm and can be up to 5, in some cases, up to 4, in other cases up to 3, and, in some instances, up to 2.5 mm. When the size of the expanded polymer particles or prepuff particles are too small or too large, the physical properties of concrete articles made using the concrete composition of the present method can be undesirable. The average particle size of the expanded polymer particles or prepuff particles can be any value and can range between any of the values recited above. The average particle size of the expanded polymer particles or prepuff particles can be determined using laser diffraction techniques or by screening according to mesh size using mechanical separation methods well known in the art.

In an embodiment of the invention, the polymer particles or expanded polymer particles have a minimum average cell wall thickness, which helps to provide desirable physical properties to concrete articles made using the present concrete composition. The average cell wall thickness and inner cellular dimensions can be determined using scanning electron microscopy techniques known in the art. The expanded polymer particles can have an average cell wall thickness of at least 0.15 µm, in some cases, at least 0.2 µm and, in other cases, at least 0.25 µm. Not wishing to be bound to any particular theory, it is believed that a desirable average cell wall thickness results when resin beads having the above-described dimensions are expanded to the above-described densities.

In an embodiment of the invention, the polymer beads are expanded to form the expanded polymer particles such that a desirable cell wall thickness as described above is achieved. Though many variables can impact the wall thickness, it is desirable, in this embodiment, to limit the expansion of the polymer bead so as to achieve a desired wall thickness and resulting expanded polymer particle strength. Optimizing processing steps and blowing agents can expand the polymer beads to a minimum of 1.25 lb/ft$^3$ (0.02 g/cc). This property of the expanded polymer bulk density, can be described by pcf (lb/ft$^3$) or by an expansion factor (cc/g).

In order to provide expanded polymer particles with desirable cell wall thickness and strength, the expanded polymer particles are not expanded to their maximum expansion factor; as such, an extreme expansion yields particles with undesirably thin cell walls and insufficient strength. Further, the polymer beads can be expanded at least 5%, in some cases, at least 10%, and, in other cases, at least 15% of their maximum expansion factor. However, so as not to cause the cell wall thickness to be too thin, the polymer beads are expanded up to 80%, in some cases, up to 75%, in other cases, up to 70%, in some instances, up to 65%, in other instances, up to 60%, in some circumstances, up to 55%, and, in other circumstances, up to 50% of their maximum expansion factor. The polymer beads can be expanded to any degree indicated above or the expansion can range between any of the values recited above.

In embodiments of the invention, the prepuff particles can have an expansion factor of at least 10 and, in some cases, at least 12 cc/g and can be up to 70, in some cases, up to 60 cc/g and, in other cases, up to 50 cc/g. The expansion factor of the prepuff particles can be any value or range between any of the values recited above.

The prepuff or expanded polymer particles typically have a cellular structure or honeycomb interior portion and a generally smooth continuous polymeric surface as an outer surface, i.e., a substantially continuous outer layer. The smooth continuous surface can be observed using scanning electron microscope (SEM) techniques at 1000× magnification. SEM observations do not indicate the presence of holes in the outer surface of the prepuff or expanded polymer particles. Cutting sections of the prepuff or expanded polymer particles and taking SEM observations reveals the generally honeycomb structure of the interior of the prepuff or expanded polymer particles.

The substantially continuous outer layer and internal structure of the prepuff particles used in the present method provide a key feature in the present method. Traditional light weighting aggregates and, in many cases, EPS particles used in the prior art absorbed and/or adsorbed water from concrete formulations during pumping and/or extended mixing operations resulting water being isolated from the rest of the concrete composition. In particular, the EPS particles of the prior art lack the structural integrity to maintain their shape and form during mixing operations and would become irreversibly crushed. This "resident water" in prior art EPS particles causes higher concrete relative humidity and/or higher concrete moisture vapor emission rates. The continuous outer layer of the prepuff or expanded polymer particles of the present compositions and methods overcomes this deficiency by providing a hydrophobic surface, minimizing water uptake and the resultant higher concrete relative humidity and/or higher concrete moisture vapor emission rates.

As indicated above, the prepuff particles used in the present method have a generally smooth continuous polymeric surface as an outer surface so the amount of water they absorb or adsorb is minimal. Thus, less water is required in the concrete composition to hydrate and otherwise react with the cement and less free water is present in the concrete.

The polymer particles or expanded polymer particles can have any cross-sectional shape that allows for providing desirable physical properties in concrete articles. In an embodiment of the invention, the expanded polymer particles have a circular, oval or elliptical cross-section shape. In embodiments of the invention, the prepuff or expanded polymer particles have an aspect ratio of 1, in some cases, at least 1 and the aspect ratio can be up to 3, in some cases, up to 2 and, in other cases, up to 1.5. The aspect ratio of the prepuff or expanded polymer particles can be any value or range between any of the values recited above.

The concrete compositions used in the present method include fine aggregate, a non-limiting example of such being sand. In embodiments of the invention, the fine aggregate can be characterized as having a "fineness modulus" or "FM" of less than 4, in some cases, less than 3.5, in other cases less than 3, in some instances, less than 2.5 and, in other instances, less than 2.

The present method differs substantially from the prior art. In the prior art, expanded polymers or EPS was incorporated into concrete formulations by replacing a proportionate volume of fine aggregate or sand. This approach provided concrete with a reduced density or weight but with a substantial loss in strength that rendered it unacceptable for structural applications. As indicated above, the amount of coarse aggregate is generally not reduced because it is generally accepted that reducing coarse aggregate reduces the strength of the concrete.

In the present inventive method, it has been discovered that replacing coarse aggregate with the present prepuff or expanded polymer particles, and leaving the amount of fine aggregate or sand unchanged, provides a light weight concrete composition suitable for many structural applications.

In many embodiments of the invention, the amount of coarse aggregate is reduced and the amount of fine aggregate and prepuff particles are adjusted to provide a target concrete density.

Surprisingly and contrary to generally accepted concrete industry practice, the concrete compositions according to the present invention demonstrate improved strength compared to similar compositions containing higher amounts of coarse aggregate.

In some embodiments of the invention, the strength of the concrete made using the present method increases when fine aggregate with an FM of less than 2 is used in the concrete composition. In these embodiment of the invention, all, or a portion of the sand or other fine aggregate used in the concrete composition of the present method, has a fineness modulus of less than 2, in some cases, less than 1.9 and, in other cases, less than 1.8.

In other embodiments of the invention, it is advantageous to use a bimodal fine aggregate or sand such that a portion has an FM of between 2 and 4 ("High FM") and another portion has an FM of less than 2 ("Low FM"). In these embodiments, the weight ratio of High FM to Low FM fine aggregate or sand can be up to 90:10, in some cases, up to 75:25 and, in other cases, up to 60:40 and can be 50:50, additionally, the ratio can be as low as 10:90, in some cases, as low as 25:75 and, in other cases, as low as 40:60. The High FM to Low FM fine aggregate ratio can be any value or range between any of the values recited above.

In the concrete composition of the present method, the sand and/or other fine aggregate can make up at least 1, in some instances, at least 5, in other instances, at least 10, in some cases, at least 15, in other cases, at least 20 volume percent of the concrete composition of the present method. Further, sand and/or other fine aggregate can provide up to 50, in some cases, up to 45, in other cases, up to 40, and, in some instances, up to 35 volume percent of the concrete composition of the present method. The amount of sand and/or other fine aggregate is adjusted to provide desired properties to the concrete composition of the present method. The amount of sand and/or other fine aggregate can be any value or range between any of the values recited above.

In an embodiment of the invention, the cement includes a hydraulic cement composition. The hydraulic cement composition can be present at a level of at least 3, in certain situations, at least 5, in some cases, at least 8, and, in other cases, at least 9 volume percent and can be present at levels up to 40, in some cases, up to 35, in other cases, up to 30, and, in some instances, up to 20 volume percent of the concrete composition mixture. The concrete composition can include the hydraulic cement composition at any of the above-stated levels or at levels ranging between any of levels stated above.

In a particular embodiment of the invention, the hydraulic cement composition can be one or more materials selected from Portland cements, pozzolana cements, gypsum cements, aluminous cements, magnesia cements, silica cements, and slag cements. Further, various cement types as defined in ASTM C150 can be used in the invention, non-limiting examples of which include Type I (for use when the special properties of other cement types are not required), Type IA (for air-entraining cement of Type I quality), Type II (for general use when moderate sulfate resistance or moderate heat of hydration is desired), Type IIA (for air-entraining cement of Type II quality), Type III (for use when high early strength is desired), Type IIIA (for air-entraining cement of Type III quality), Type IV (for use when a low heat of hydration is desired), and Type V (for use when high sulfate resistance is desired).

In a particular embodiment of the invention, the cement composition is Type I or Type III Portland cement.

The concrete composition of the present method contains water, at from at least about 10 volume percent, in some cases, at least about 12, and, in other cases, at least about 14 volume percent up to about 22 volume percent, in some cases, up to about 20 volume percent and, in other cases, up to about 18 volume percent. The amount of water in the concrete composition will depend in many instances on the desired water to cement ratio and amount of cement in the concrete composition and its anticipated effect on concrete relative humidity and/or concrete moisture vapor emission rates. The amount of water in the concrete composition of the present method can be any value or range between any of the values recited above.

In embodiments of the invention, the water to cement ratio can be greater than 0.3, in some instances, at least about 0.32, in some cases, at least about 0.34, and, in other cases, at least about 0.35 and can be up to about 0.7, in some cases, up to about 0.65, in other cases, up to about 0.6, and, in some instances, up to about 0.5. The water to cement ratio used in the invention will depend, among other thing, on expected environmental conditions and the particular ingredients used to make a concrete composition. The water to cement ratio can be any value or range between any of the values recited above.

Traditional light weighting aggregates can be included in the concrete compositions of the present method; however, the amount and type of such aggregates is limited based on the relative humidity and/or moisture vapor emission rate properties they cause in the concrete. Non-limiting examples of light weighting aggregates that can be used in this regard include insulating aggregates, such as, pumice, perlite, vermiculite, scoria, and diatomite; concrete aggregate, such as, expanded shale, expanded slate, expanded clay, expanded slag, pelletized aggregate, tuff, and macrolite; and masonry aggregate, such as, expanded shale, clay, slate, expanded blast furnace slag, sintered fly ash, coal cinders, pumice, scoria, pelletized aggregate and combinations thereof.

The other or traditional light weighting aggregates can optionally be present in the concrete compositions of the present method and when used can be present at a level of at least 0.5, in some cases at least 1, in other cases at least 2, and in some instances at least 5 volume percent and can be present at up to 40, in some cases, up to 30, in other cases, up to 25, in some instances, up to 20, in other instances, up to 15, and in particular instances up to 10 volume percent of the concrete composition.

In an embodiment of the invention, the concrete composition can optionally include other aggregates and adjuvants known in the art including but not limited to additional aggregate, plasticizers and/or fibers. Suitable fibers include, but are not limited to glass fibers, silicon carbide, aramid fibers, polyester, carbon fibers, composite fibers, fiberglass, steel fibers and combinations thereof, as well as, fabric containing the above-mentioned fibers, and fabric containing combinations of the above-mentioned fibers.

Non-limiting examples of fibers that can be used in the invention include MeC-GRID® and C-GRID® available from TechFab, LLC, Anderson, S.C.; KEVLAR® available from E.I. du Pont de Nemours and Company, Wilmington, Del.; TWARON® available from Teijin Twaron B. V., Arnheim, the Netherlands; SPECTRA® available from Honeywell International Inc., Morristown, N.J.; DACRON® available from Invista North America S.A.R.L. Corp. Wilmington, Del.; and VECTRAN® available from Hoechst Cellanese Corp., New York, N.Y. The fibers can be used in a mesh structure, intertwined, interwoven, and oriented in any desirable direction.

In a particular embodiment of the invention, fibers can make up at least 0.1, in some cases, at least 0.5, in other cases, at least 1, and, in some instances, at least 2 volume percent of the concrete composition. Further, fibers can provide up to 10, in some cases, up to 8, in other cases up to 7, and, in some instances, up to 5 volume percent of the concrete composition. The amount of fibers is adjusted to provide desired properties to the concrete composition. The amount of fibers can be any value or range between any of the values recited above.

In embodiments of the invention, the lightweight concrete compositions can contain one or more additives, non-limiting examples of such being, anti-foam agents, water-proofing agents, dispersing agents, set-accelerators, set-retarders, plasticizing agents, superplasticizing agents, water reducers, bonding agents, freezing point decreasing agents, adhesiveness-improving agents, and colorants. The additives are typically present at less than one percent by weight with respect to total weight of the composition, but can be present at from 0.1 to 3 weight percent.

Suitable dispersing agents or plasticizers that can be used in the invention include, but are not limited to, hexametaphosphate, tripolyphosphate, polynaphthalene sulphonate, sulphonated polyamine and combinations thereof.

Suitable plasticizing agents that can be used in the invention include, but are not limited to, polyhydroxycarboxylic acids or salts thereof, polycarboxylates or salts thereof; lignosulfonates, polyethylene glycols, and combinations thereof.

Suitable superplasticizing agents that can be used in the invention include, but are not limited to, alkaline or earth alkaline metal salts of lignin sulfonates; lignosulfonates, alkaline or earth alkaline metal salts of highly condensed naphthalene sulfonic acid/formaldehyde condensates; polynaphthalene sulfonates, alkaline or earth alkaline metal salts of one or more polycarboxylates (such as poly(meth) acrylates and the polycarboxylate comb copolymers described in U.S. Pat. No. 6,800,129, the relevant portions of which are herein incorporated by reference); alkaline or earth alkaline metal salts of melamine/formaldehyde/sulfite condensates; sulfonic acid esters; carbohydrate esters; and combinations thereof.

Non-limiting examples of suitable water reducers include lignosulfonates, sodium naphthalene sulfonate formaldehyde condensates, sulfonated melamine-formaldehyde resins, sulfonated vinylcopolymers, urea resins, and salts of hydroxy- or polyhydroxy-carboxylic acids, a 90/10 w/w mixture of polymers of the sodium salt of naphthalene sulfonic acid partially condensed with formaldehyde and sodium gluconate as described in U.S. Pat. No. 3,686,133, and combinations thereof.

Examples of suitable bonding agents include materials that can be either inorganic or organic and are soft and workable when fresh but set to form a hard, infusible solid on curing, either by hydraulic action or by chemical crosslinking Non-limiting examples of such materials can include organic materials, such as, rubber, polyvinyl chloride, polyvinyl acetate, acrylics, styrene butadiene copolymers, and various powdered polymers.

Suitable set-accelerators that can be used in the invention include, but are not limited to, soluble chloride salts (such as, calcium chloride), triethanolamine, paraformaldehyde, soluble formate salts (such as, calcium formate), sodium hydroxide, potassium hydroxide, sodium carbonate, sodium sulfate, $12CaO.7Al_2O_3$, sodium sulfate, aluminum sulfate, iron sulfate, the alkali metal nitrate/sulfonated aromatic hydrocarbon aliphatic aldehyde condensates disclosed in U.S. Pat. No. 4,026,723, the water soluble surfactant accelerators disclosed in U.S. Pat. No. 4,298,394, the methylol derivatives of amino acids accelerators disclosed in U.S. Pat. No. 5,211,751, and the mixtures of thiocyanic acid salts, alkanolamines, and nitric acid salts disclosed in U.S. Pat. No. Re. 35,194, the relevant portions of which are herein incorporated by reference, and combinations thereof.

Suitable set-retarders that can be used in the invention include, but are not limited to, lignosulfonates, hydroxycarboxylic acids (such as, gluconic acid, citric acid, tartaric acid, maleic acid, salicylic acid, glucoheptonic acid, arabonic acid, and inorganic or organic salts thereof, such as, sodium, potassium, calcium, magnesium, ammonium and triethanolamine salt), cardonic acid, sugars, modified sugars, phosphates, borates, silico-fluorides, calcium bromate, calcium sulfate, sodium sulfate, monosaccharides such as glucose, fructose, galactose, saccharose, xylose, apiose, ribose and invert sugar, oligosaccharides such as disaccharides and trisaccharides, such as, oligosaccharides as dextrin, polysaccharides such as, dextran, and other saccharides, such as, molasses containing these; sugar alcohols, such as, sorbitol; magnesium silicofluoride; phosphoric acid and salts thereof, or borate esters; aminocarboxylic acids and salts thereof; alkali-soluble proteins; humic acid; tannic acid; phenols; polyhydric alcohols such as glycerol; phosphonic acids and derivatives thereof, such as, aminotri(methylenephosphonic acid), 1-hydroxyethylidene-1,1-diphosphonic acid, ethylenediaminetetra(methylenephosphonic acid), diethylene-triaminepenta(methylenephosphonic acid), and alkali metal or alkaline earth metal salts thereof, and combinations of the set-retarders indicated above.

Suitable defoaming agents that can be used in the invention include, but are not limited to silicone-based defoaming agents (such as, dimethylpolysiloxane, diemthylsilicone oil, silicone paste, silicone emulsions, organic group-modified polysiloxanes (polyorganosiloxanes, such as, dimethylpolysiloxane), fluorosilicone oils, etc.), alkyl phosphates (such as, tributyl phosphate, sodium octylphosphate, etc.), mineral oil-based defoaming agents (such as, kerosene, liquid paraffin, etc.), fat- or oil-based defoaming agents (such as, animal or vegetable oils, sesame oil, castor oil, alkylene oxide adducts derived therefrom, etc.), fatty acid-based defoaming agents (such as, oleic acid, stearic acid, and alkylene oxide adducts derived therefrom, etc.), fatty acid ester-based defoaming agents (such as, glycerol monoricinolate, alkenyl-succinic acid derivatives, sorbitol monolaurate, sorbitol trioleate, natural waxes, etc.), oxyalkylene type defoaming agents, alcohol-based defoaming agents (such as, octyl alcohol, hexadecyl alcohol, acetylene alcohols, glycols, etc.), amide-based defoaming agents (such as, acrylate polyamines, etc.), metal salt-based defoaming agents (such as, aluminum stearate, calcium oleate, etc.) and combinations of the above-described defoaming agents.

Suitable freezing point decreasing agents that can be used in the invention include, but are not limited to, ethyl alcohol, calcium chloride, potassium chloride, and combinations thereof.

Suitable adhesiveness-improving agents that can be used in the invention include, but are not limited to, polyvinyl acetate, styrene-butadiene, homopolymers and copolymers of (meth)acrylate esters, and combinations thereof.

Suitable water-repellent or water-proofing agents that can be used in the invention include, but are not limited to fatty acids (such as, stearic acid or oleic acid), lower alkyl fatty acid esters (such as, butyl stearate), fatty acid salts (such as, calcium or aluminum stearate), silicones, wax emulsions, hydrocarbon resins, bitumen, fats and oils, silicones, paraffins, asphalt, waxes, and combinations thereof. Although not used in many embodiments of the invention, when used, suitable air-entraining agents include, but are not limited to, vinsol resins, sodium abietate, fatty acids and salts thereof, tensides, alkyl-aryl-sulfonates, phenol ethoxylates, lignosulfonates, and mixtures thereof.

The concrete composition of the present method can be prepared, made and/or produced by combining cement, water, prepuff or expanded polymer particles, and any other aggregates, additives and/or adjuvants to provide a uniform and/or homogeneous dispersion of prepuff or expanded polymer particles in the concrete composition of the present method.

In embodiments of the invention, cement, water and, optionally, aggregates and, optionally, additives are combined to form an aqueous cement slurry. The prepuff or expanded polymer particles are then added to the aqueous cement slurry to form a dispersion of prepuff or expanded polymer particles in a concrete composition of the present method.

When preparing the concrete composition of the present method, it is often desirable to meter or add the prepuff or expanded polymer particles to the aqueous cement slurry over a period of time to aid in uniform incorporation and to avoid clumping or aggregation of the expanded polymer particles to localized regions of the concrete composition.

As indicated above, the prepuff or expanded polymer particles can be aged prior to being added to the aqueous cement slurry. In particular embodiments of the invention, the prepuff or expanded polymer particles can be aged in maturing silos or hoppers prior to adding them to the aqueous cement slurry.

In embodiments of the invention, the prepuff or expanded polymer particles are added to the aqueous cement slurry using one or more of gravity, pneumatic conveyance, an augur system, and/or conveyor belts. Prior to being added to the aqueous cement slurry, the prepuff or expanded polymer particles can be moved via gravity, pneumatic conveyance, an augur system, and/or conveyor belts to one or more load cells and then conveyed to the aqueous cement slurry. In this latter embodiment, the load cell can be used in a feedback loop to regulate the rate at which the prepuff or expanded polymer particles are added to the aqueous cement slurry as well as the overall amount of prepuff or expanded polymer particles added to the aqueous cement slurry.

In many embodiments of the invention, the prepuff or expanded polymer particles are added to the aqueous cement slurry over a period of time of at least 30 seconds, in some cases, at least 45 seconds and, in other cases, at least one minute and can be added over a period of time of up to 15 minutes, in some cases, up to 10 minutes and, in other cases, up to 5 minutes. The prepuff or expanded polymer particles can be added to the aqueous cement slurry over any period of time or range between any of the periods of time indicated above.

In particular embodiments of the invention, the prepuff or expanded polymer particles are aged in maturing silos or hoppers as described, conveyed to one or more load cells; and then conveyed to the aqueous cement slurry.

In embodiments of the invention, when the prepuff or expanded polymer particles are conveyed, they can be conveyed or added to the aqueous cement slurry using one or more of a metering device or a rotary airlock device. In these embodiments, individual compartments containing prepuff or expanded polymer particles are moved along a belt or ramp. The smaller the individual compartments, the more accurate the amount of added prepuff or expanded polymer particles will be. In particular embodiments of the invention, the individual compartments can be at least 0.001%, in some cases, at least 0.0025% and, in other cases, 0.005% and can be up to 1%, in some cases, up to 0.75%, and, in other cases, up to 0.5% of the total volume of prepuff or expanded polymer particles to be added to the aqueous cement slurry. The size of the individual compartments is typically determined based on the accuracy required, the rate of addition, and the volume of prepuff or expanded polymer particles to be added to the aqueous cement slurry. The size of the individual compartments can be any value or range between any of the values recited above.

In many embodiments of the invention, the mixing method provides a concrete composition ready for discharge from a mixer in no more than five minutes, in some cases, no more than four minutes and thirty seconds and, in other cases, no more than four minutes.

In particular embodiments of the invention, the mixing method is carried out using a control system, which is provided for automatic operation of the steps in the method. In specific embodiments, the load cell and interfaces with metering devices, rotary airlock device, gravity feed devices, pneumatic conveyance devices, augur systems, and/or conveyor belts are automated through the control system.

In many embodiments of the invention, the control system includes a microprocessor based batching controller with weight indicator. Further to this embodiment, batch weights can be entered into the batching controller and the steps are completed in an automatic and/or automated fashion thereafter.

In some embodiments of the invention, the prepuff or expanded polymer particles can be combined with at least a portion of the water used to form the slurry. The combination can be sprayed under pressure to add the prepuff or expanded polymer particles to the aqueous cement slurry. This embodiment can be combined with many of the other various mixing embodiments described herein. In particular aspects of this embodiment, the prepuff or expanded polymer particles can be combined with the water by way of an eductor and introduced to a mixer to form the aqueous cement slurry.

In other embodiments of the invention, the prepuff or expanded polymer particles can be combined with at least a portion of the cement and added to a mixer to form the concrete composition of the present method.

The density of the concrete composition of the present method can be at least 90 lb/ft$^3$ (1.4 g/cc), in some cases, at least 93 lb/ft$^3$ (1.5 g/cc), and in other cases, at least 99 lb/ft$^3$ (1.6 g/cc and the density can be up to 135 lb./ft$^3$ (2.1 g/cc), in some situations, up to 130 lb/ft$^3$ (2.1 g/cc), in some cases, 120 lb/ft$^3$ (1.9 g/cc), and in other cases, up to 115 lb/ft$^3$ (1.8 g/cc). The density of the concrete composition of the present method can be any value and can range between any of the values recited above. The density of the concrete compositions can be determined according to ASTM C 138.

The methods of the present invention can be used with any type of concrete application, but are particularly useful when placing ready mix concrete in forms or at heights above the discharge point of a ready mix concrete truck.

As non-limiting examples, ready mix can include central-mixed concrete, transit-mixed concrete, and shrink-mixed concrete.

Central-mixed concrete is completely mixed at a plant and then transported in a truck-mixer or agitator truck. Freshly mixed concrete compositions can be transported in an open dump truck if the jobsite is near the plant. Slight agitation of the concrete during transit prevents segregation of the materials and reduces the amount of slump loss.

In transit-mixed (also known as truck-mixed) concrete, materials are batched at a central plant and are completely mixed in the truck in transit. Frequently, the concrete composition is partially mixed in transit and mixing is completed at the jobsite. Transit-mixing keeps the water separate from the cement and aggregates and allows the concrete to be mixed immediately before placement at the construction site. This method avoids the problems of premature hardening and slump loss that result from potential delays in transportation or placement of central-mixed concrete. Additionally, transit-mixing allows concrete to be hauled to construction sites further away from the plant. A disadvantage to transit-mixed concrete, however, is that the truck capacity is smaller than that of the same truck containing central-mixed concrete.

Shrink-mixed concrete is used to increase the truck's load capacity and retain the advantages of transit-mixed concrete. In shrink-mixed concrete, the concrete composition is partially mixed at the plant to reduce or shrink the volume of the mixture and mixing is completed in transit or at the jobsite.

Ready mixed concrete is often remixed once it arrives at the jobsite to ensure that the proper slump is obtained; however, concrete that has been remixed tends to set more rapidly than concrete mixed only once. Materials, such as, water and some varieties of admixtures, are often added to the concrete composition at the jobsite after it has been batched to ensure that the specified properties are attained before placement.

The concrete compositions of the present method can be designed for specific applications. As non-limiting examples, a high slump concrete composition can be desirable when the concrete must be placed around a high concentration of reinforcing steel. Also, a low slump concrete composition can be desirable when concrete is placed in large open forms, or when the form is placed on a slope.

As such, in some embodiments of the invention, the concrete compositions will have a measurable slump value, sampled according to ASTM C 172 (Standard Practice for Sampling Freshly Mixed Concrete) and measured according to ASTM C 143 (Standard Test Method for Slump of Hydraulic Cement Concrete). The exact slump value is designed into a particular mix and will depend on the application and the design of the concrete composition. In typical use, the slump will range from at least about 2 inches (5 cm) and, in some cases, at least about 3 inches (7.6 cm) to up to about 8 inches (20 cm), in some cases, up to about 7 inches (18 cm) and, in other cases, up to about 6 inches (15 cm). If the concrete delivered to a project is too stiff (low slump), it may be difficult to discharge it from a truck. If the slump is too high, the concrete may not be useable. As indicated above, the concrete compositions of the present method resist the low slump problem. In this embodiment, the slump can be any value recited above or range between any of the recited values.

In other particular embodiments of the invention, the concrete composition of the present method is used in traditional ready mix application, which include, but are not limited to tilt up construction, pour in place, lightweight grouts, ICF fill and other applications where concrete is poured or pumped and transported, for example, in ready-mix trucks, to job sites.

As indicated above, in embodiments of the present method, one or more concrete mixing trucks containing the concrete composition of the present method feed a collecting hopper. The collecting hopper is connected to a suitable concrete pump. The collecting hopper and pump can be mounted on a vehicle or truck.

Any suitable concrete pump can be used as long as it is equipped to handle large quantities of concrete and transport it by means of pumping through pipelines over appreciable distances, often to locations that may not be easily accessible by other means of delivery. Non-limiting examples of suitable pumps include direct acting pumps and squeeze pumps.

Suitable direct-acting concrete pumps include static or portable pumps, which can, in the latter case, include mounting the pump on a suitable vehicle or truck. Truck-mounted concrete pumps typically operate with shorter delivery pipelines. The pump feeds concrete to the delivery pipeline attached to a hydraulically-maneuvered articulated telescopic arm referred to as the placing boom. The pipeline length thus corresponds to the horizontal reach of the placing boom. Using direct acting pumps, concrete can be readily pumped up to distances of 950 feet (450 m) horizontally or 106 feet (50 m) vertically. For larger distances, relay pumping using pumps in series can be adopted.

Squeeze pumps can also be truck-mounted and deliver concrete using a placing boom. Squeeze pumps can transport concrete up to a maximum distance of 190 feet (90 m) horizontally or 64 feet (30 m) vertically.

A particular advantage of the present method is that smaller pumps that utilize less energy can be used to place the concrete composition of the present method.

In the present method, the system for pumping concrete can include a hopper into which the concrete is discharged from a mixer, which in turn, feeds the concrete pump itself and the delivery pipelines through which the concrete is delivered.

The diameter of the pipes can be at least 2 inches (5 cm), in some cases, at least 3 inches (7.5 cm) and, in other cases, at least 4 inches (10 cm) and can be up to 24 inches (61 cm), in some cases, up to 18 inches (46 cm) and, in other cases, up to 12 inches (30.5 cm). The diameter of the pipes can be any value or range between any of the values recited above. Additionally, combinations of pipe sizes can be used when appropriate.

After being placed, the concrete compositions of the present method, when set and/or hardened, have a compressive strength of at least about 1700 psi (119 kg/cm$^2$), in some cases, at least about 1800 psi (126 kg/cm$^2$), in other cases, at least about 1900 psi (133 kg/cm$^2$), in some instances, at least about 2000 psi (140 kg/cm$^2$), in other instances, at least about 2100 psi (147 kg/cm$^2$), in some situations, at least about 2500 psi (176 kg/cm$^2$) and, optionally, can be up to about 7000 psi (490 kg/cm$^2$), in some instances, up to about 6500 psi (455 kg/cm$^2$), in other instances, up to about 6000 psi (420 kg/cm$^2$) in some cases, up to about 5500 psi (385 kg/cm$^2$) and, in other cases, up to about 5000 psi (350 kg/cm$^2$).

In other embodiments of the invention, the concrete compositions of the present method have structural compressive strengths of about 4000 psi (281 kg/cm$^2$) or greater in 48 hours for post-tensioned applications and 28-day compressive strengths of about 4500 psi (316 kg/cm$^2$) or greater. In these embodiments, compressive strengths are determined according to ASTM C39. The exact compressive strength of a concrete composition will depend on its formulation, density and intended application. The compressive strength of the concrete compositions of the present method can be any value or range between any of the values recited above.

The concrete compositions of the present method can be used in most, if not all, applications where traditional concrete formulations are used. As non-limiting examples, the concrete compositions of the present method can be used in structural and architectural applications, non-limiting examples being party walls, ICF or SIP structures, floor systems, roof or ceiling systems, road beds, bird baths, benches, shingles, siding, drywall, cement board, decorative pillars or archways for buildings, etc., furniture or household applications such as, counter tops, in-floor radiant heating systems, floors (primary and secondary), tilt-up walls, sandwich wall panels, as a stucco coating, road and airport safety applications, such as, arresting walls, Jersey Barriers, sound barriers and walls, retaining walls, runway arresting systems, air entrained concrete, runaway truck ramps, flowable excavatable backfill, and road construction applications, such as, road bed material and bridge deck material.

When the concrete compositions of the present method are used in road bed construction, the expanded polymer particles can aid in preventing and/or minimizing crack propagation, especially when water freeze-thaw is involved.

The concrete compositions of the present method are well suited to the fabrication of molded construction articles and materials, non-limiting examples of such include wall panels including tilt-up wall panels, T beams, double T beams, roofing tiles, roof panels, ceiling panels, floor panels, I beams, foundation walls and the like.

In an embodiment of the invention, the molded construction articles and materials can be pre-cast and/or pre-stressed.

As used herein, "pre-cast" concrete refers to concrete poured into a mold or cast of a required shape and is allowed to cure and/or harden before being taken out and put into a desired position.

In embodiments of the invention, the concrete compositions can be used in pre-cast applications, which include, but are not limited to precast parts, such as, beams, pipes, insulated walls, prestressed products, and other products where the concrete composition is poured directly into forms and final parts are transported to job sites by truck. In these embodiments of the invention, the slump flow value ranges from at least about 8 inch (20 cm) and, in some cases, at least about 10 inches (25.4 cm) to up to about 26 inches (66 cm), in some situations up to about 24 inches (61 cm), in some instances, up to about 22 inches (56 cm), in other instances, up to about 20 inches (50 cm), in some cases, up to about 18 inches (46 cm) and, in other cases, up to about 16 inches (41 cm). In these embodiments, the slump flow can be any value or range between any of the recited values and can be determined according to ASTM C 1611.

As used herein, "pre-stressed" concrete refers to concrete whose tension has been improved by using prestressing tendons (in many cases high tensile steel cable or rods), which are used to provide a clamping load producing a compressive strength that offsets the tensile stress that the concrete member would otherwise experience due to a bending load. Any suitable method known in the art can be used to pre-stress concrete. Suitable methods include, but are not limited to, pre-tensioned concrete, where concrete is cast around already tensioned tendons, and post-tensioned concrete, where compression is applied after the pouring and curing processes.

As indicated above, one particular advantage of the present invention is that the relative humidity of the concrete composition of the present method, measured according to ASTM F 1869-04, is lower than the relative humidity of a corresponding concrete composition where none of the fine aggregate and/or coarse aggregate has been replaced with prepuff particles.

Further, another particular advantage of the present invention is that the moisture vapor emission rate of the concrete surface, measured according to ASTM F 2170-02, is lower than the moisture vapor emission rate of a corresponding concrete surface made from a concrete composition where none of the light weight aggregates have been replaced with prepuff particles.

Embodiments of the invention are directed to a method of preparing a light weight concrete composition using expanded polymer particles that includes (a) selecting a fine aggregate to total aggregate volumetric ratio; (b) selecting a target concrete density; (c) replacing coarse aggregate with the present prepuff particles while maintaining the fine aggregate to total aggregate volumetric ratio. In particular aspects of this embodiment of the invention, the prepuff particles replace from about 10 to about 50 volume percent of the coarse aggregate in the concrete mix; and the concrete mix is prepared including 3-40 volume percent cement, 1-50 volume percent fine aggregate, 0-40 volume percent coarse aggregate, 10-22 volume percent water, and 5-40 volume percent of prepuff particles.

In particular embodiments of the invention, the fine aggregate to total aggregate volumetric ratio can be at least about 0.5, in some cases at least about 0.55 and in other cases at least about 0.6 and can be up to about 0.8, in some cases up to about 0.75 and in other cases up to about 0.7. The exact fine aggregate to total aggregate volumetric ratio will vary depending on the desired properties of the concrete. The fine aggregate to total aggregate volumetric ratio can be any value or range between any of the values recited above.

The present invention will further be described by reference to the following examples. The following examples are merely illustrative of the invention and are not intended to be limiting. Unless otherwise indicated, all percentages are by weight and Portland cement is used unless otherwise specified.

EXAMPLES

Corrected Air

Using an air pressure meter according to ASTM C231 to measure the volume percent of air in concrete samples containing prepuff particles according to the invention often gives values that are higher than the actual air content because the prepuff particles compress, which increases the amount of air displayed on the pressure meter dial. In order to make an accurate measure of the total air in fresh concrete containing prepuff particles, the pressure meter reading must be corrected to account for compression of the prepuff particles in the freshly mixed concrete. The correction method was developed using concrete containing prepuff particles having a density of 1.4 lb/ft3 and mean particle size of 1.5 mm. In section 6 of ASTM C231 a procedure is given to measure and subtract any contribution to the total air reading from the aggregates used in the concrete mix and is referred to as an "aggregate correction factor". The modified ASTM C231 test method incorporates placing a US Standard 18 mesh screen over the openings on the bottom of the type B pressure meter. This method was validated using prepuff particle volume loadings of from 0 to 25%.

The calculation of air in a prepuff particle containing concrete mix is modified as follows (see ASTM C231 equation 5):

Total air reading (pressure meter, %) −

$$CF\ (\%) - \text{Aggregate correction factor } (\%) =$$

$$\text{Actual Air content of sample tested } (\%)$$

The Aggregate correction factor is determined according to ASTM C231. The empirical equation for the prepuff particle containing concrete correction factor (CF) was determined and used in the following examples as follows:

$$CF(\%) = -0.196x^2 + 0.1336x - 0.0007$$

$x$ = % Volume of prepuff particles

Example 1

The following example demonstrates the methods according to the present invention in a ready-mix type concrete formulation. The ingredients were combined in 1.25 ft³ batches in a concrete mixer. The prepuff particles had a bulk density of 1.4 lb/ft³ (mean particle size of 1.5 mm, aspect ratio of approximately 1 and a smooth polystyrene outer surface) available as ELEMIX® XE concrete additive from NOVA Chemicals Inc., Pittsburgh, Pa. The cement was Lehigh type I cement, sand meeting ASTM C33, the coarse aggregate was 67 limestone, and Sika Viscocrete 2100 high range water reducer (3-4.5 oz/cwt) was used at a water to cement ratio of 0.43. Compressive strengths were measured at 7 and 28 days. The data are shown in the table below.

|  | Sample No. | | | |
| --- | --- | --- | --- | --- |
|  | A | B | C | D |
| Slump (in) | 6.25 | 9 | 4 | 9 |
| Corrected Air (%) | 4.8 | 2.8 | 4.6 | 3.1 |
| HRWR Batched (mL) | 45 | 35 | 45 | 35 |
| Wet Density (pcf) | 120 | 124 | 128 | 131 |
| Cubic Yard Mix (lbs/yd³) | | | | |
| Cement | 722 | 722 | 722 | 722 |
| Sand | 1740 | 1191 | 2014 | 1465 |
| EPS | 11.20 | 11.48 | 7.02 | 7.3 |
| Coarse Aggregate | 457 | 1006 | 457 | 1006 |
| Water | 310 | 310 | 310 | 310 |
| VOLUME % | | | | |
| Cement | 13.6% | 13.6% | 13.6 | 13.6 |
| Sand | 39.4% | 26.9% | 45.6 | 33.1 |
| EPS | 16.6% | 17.0% | 10.4 | 10.8 |
| Coarse Aggregate | 10.0% | 22.0% | 10.0 | 22.0 |
| Water | 18.4% | 18.4% | 18.4 | 18.4 |
| Design Air | 2.0% | 2.0% | 2.0 | 2.0 |
| 7 day Compressive Str. | 2832 | 2342 | 3690 | 3197 |
| 28 day Compressive Str. | 3501 | 2887 | 4471 | 4148 |

The data show a trend where compressive strength decreases with increasing coarse aggregate loading at relatively constant 125 pcf or 130 pcf concrete density.

Example 2

The following example demonstrates the methods according to the present invention in a ready-mix concrete formulation. The ingredients were combined as indicated above using the same prepuff particles, cement, sand, limestone coarse aggregate, and water reducer as in Example 1 at a water to cement ratio of 0.41. Compressive strengths were measured at 7 and 28 days. The data are shown in the table below.

| Sample No. | E | F | G | H | I | J | K | L |
| --- | --- | --- | --- | --- | --- | --- | --- | --- |
| Slump (in) | 8.5 | 3.25 | 7.25 | 8 | 5.75 | 5.5 | 7.75 | 6 |
| Corrected Air (%) | 4.6 | 4.6 | 3.8 | 3.8 | 4.4 | 4.0 | 4.4 | 4.1 |
| HRWR Batched (mL) | 55 | 40 | 38 | 35 | 50 | 35 | 45 | 40 |
| Wet Density (pcf) | 125 | 125 | 126 | 125 | 131 | 130 | 129 | 131 |
| Cubic Yard Mix (lbs/yd³) | | | | | | | | |
| Cement | 722 | 722 | 722 | 722 | 722 | 722 | 722 | 722 |
| Sand | 1754 | 1662 | 1433 | 1342 | 1891 | 1799 | 1753 | 1571 |
| EPS | 9.54 | 9.59 | 9.7 | 9.75 | 7.45 | 7.5 | 7.52 | 7.61 |
| Coarse Aggregate | 594 | 686 | 914 | 1006 | 594 | 686 | 731 | 914 |
| Water | 296 | 296 | 296 | 296 | 296 | 296 | 296 | 296 |

-continued

| Sample No. | E | F | G | H | I | J | K | L |
|---|---|---|---|---|---|---|---|---|
| VOLUME % | | | | | | | | |
| Cement | 13.6 | 13.6 | 13.6 | 13.6 | 13.6 | 13.6 | 13.6 | 13.6 |
| Sand | 39.7 | 37.6 | 32.4 | 30.4 | 42.8 | 40.7 | 39.7 | 35.5 |
| EPS | 14.2 | 14.2 | 14.4 | 14.5 | 11.1 | 11.1 | 11.2 | 11.3 |
| Coarse Aggregate | 13.0 | 15.0 | 20.0 | 22.0 | 13.0 | 15.0 | 16.0 | 20.0 |
| Water | 17.6 | 17.6 | 17.6 | 17.6 | 17.6 | 17.6 | 17.6 | 17.6 |
| Design Air | 2.0 | 2.0 | 2.0 | 2.0 | 2.0 | 2.0 | 2.0 | 2.0 |
| 7 day Compressive Str. | 3563 | 3267 | 3120 | 2904 | 4317 | 3614 | 3722 | 3732 |
| 28 day Compressive Str. | 4359 | 4172 | 3896 | 3457 | 5415 | 4634 | 4437 | 4763 |

The data show a trend where compressive strength decreases with increasing coarse aggregate loading at relatively constant 125 pcf or 130 pcf concrete density.

Example 3

The following example demonstrates the methods according to the present invention in a ready-mix concrete formulation. The ingredients were combined in 1.25 ft$^3$ batches in a concrete mixer. The prepuff particles had a bulk density of 1.4 lb/ft$^3$ available as ELEMIX® XE concrete additive from NOVA Chemicals Inc., Pittsburgh, Pa. The cement was Lehigh type I cement, sand meeting ASTM C33, the coarse aggregate was 67 river rock, and Sika Viscocrete 2100 high range water reducer (3-4.5 oz/cwt) was used at a water to cement ratio of 0.43. Compressive strengths were measured at 7 and 28 days. The data are shown in the table below.

| | Sample No. | |
|---|---|---|
| | M | N |
| Slump (in) | 1.5 | 8.75 |
| Corrected Air (%) | 4.5 | 3.8 |
| HRWR Batched (mL) | 45 | 35 |
| Wet Density (pcf) | 119 | 125 |
| Cubic Yard Mix (lbs/yd$^3$) | | |
| Cement | 722 | 722 |
| Sand | 1906 | 1392 |
| EPS | 8.7 | 8.4 |
| Coarse Aggregate | 429 | 943 |
| Water | 310 | 310 |
| VOLUME % | | |
| Cement | 13.6% | 13.6% |
| Sand | 43.1 | 31.5 |
| EPS | 12.9 | 12.5 |
| Coarse Aggregate | 10.0 | 22.0 |
| Water | 18.4% | 18.4% |
| Design Air | 2.0% | 2.0% |
| 7 day Compressive Str. | 3653 | 2915 |
| 28 day Compressive Str. | 4575 | 3817 |

The data show a trend where compressive strength decreases with increasing coarse aggregate loading.

Example 4

The following example demonstrates the methods according to the present invention in a ready-mix concrete formulation. The ingredients were combined in 1.25 ft$^3$ batches in a concrete mixer. The prepuff particles had a bulk density of 1.4 lb/ft$^3$ available as ELEMIX® XE concrete additive from NOVA Chemicals Inc., Pittsburgh, Pa. The cement was Lehigh type I cement, sand meeting ASTM C33, the coarse aggregate was 67 granite, and Sika Viscocrete 2100 high range water reducer (3-4.5 oz/cwt) was used at a water to cement ratio of 0.43. Compressive strengths were measured at 7 and 28 days. The data are shown in the table below.

| | Sample No. | |
|---|---|---|
| | O | P |
| Slump (in) | 2 | 8.5 |
| Corrected Air (%) | 4.8 | 3.6 |
| HRWR Batched (mL) | 45 | 31 |
| Wet Density (pcf) | 126 | 127 |
| Cubic Yard Mix (lbs/yd$^3$) | | |
| Cement | 722 | 722 |
| Sand | 1885 | 1346 |
| EPS | 9.0 | 9.1 |
| Coarse Aggregate | 449 | 988 |
| Water | 310 | 310 |
| VOLUME % | | |
| Cement | 13.6% | 13.6% |
| Sand | 42.7 | 30.5 |
| EPS | 13.3 | 13.5 |
| Coarse Aggregate | 10.0 | 22.0 |
| Water | 18.4% | 18.4% |
| Design Air | 2.0% | 2.0% |
| 7 day Compressive Str. | 3527 | 2904 |
| 28 day Compressive Str. | 4416 | 3762 |

The data show a trend where compressive strength decreases with increasing coarse aggregate loading at relatively constant concrete density.

Example 5

This example evaluated the effect on concrete compressive strength of using a constant sand to total aggregate ratio of 0.69 (CR, sand/(sand+coarse aggregate)) compared with proportioning batches using a constant volume of 15% coarse aggregate (CV) in a ready-mix concrete formulation. The ingredients were combined in 1.25 ft$^3$ batches in a concrete mixer. The prepuff particles had a bulk density of 1.4 lb/ft$^3$ available as ELEMIX® XE concrete additive from NOVA Chemicals Inc., Pittsburgh, Pa. The cement was Lehigh type I cement, sand meeting ASTM C33, the coarse aggregate was 67 limestone, and Sika Viscocrete 2100 high range water reducer (3-4.5 oz/cwt) was used at a water to cement ratio of 0.41. Compressive strengths were measured at 7 and 28 days. The data are shown in the table below.

|  | Sample No. | | | | | |
|---|---|---|---|---|---|---|
|  | Q (CV) | R (CR) | S (CV) | T (CR) | U (CV) | V (CR) |
| Slump (in) | 5.25 | 3.5 | 6.25 | 4.5 | 6.5 | 8.25 |
| Corrected Air (%) | 4.1 | 4.2 | 3.7 | 4.4 | 4.5 | 3.4 |
| HRWR Batched (mL) | 35 | 36 | 44 | 40 | 50 | 43 |
| Wet Density (pcf) | 120 | 121 | 127 | 125 | 130 | 130 |
| Cubic Yard Mix (lbs/yd$^3$) | | | | | | |
| Cement | 722 | 722 | 722 | 722 | 722 | 722 |
| Sand | 1525 | 1532 | 1662 | 1626 | 1799 | 1721 |
| EPS | 11.7 | 11.7 | 9.6 | 9.6 | 7.5 | 7.5 |
| Coarse Aggregate | 686 | 679 | 686 | 721 | 686 | 764 |
| Water | 296 | 296 | 296 | 296 | 296 | 296 |
| VOLUME % | | | | | | |
| Cement | 13.6 | 13.6 | 13.6 | 13.6 | 13.6 | 13.6 |
| Sand | 34.5 | 34.7 | 37.6 | 36.8 | 40.7 | 38.9 |
| EPS | 17.3 | 17.3 | 14.2 | 14.2 | 11.1 | 11.2 |
| Coarse Aggregate | 15.0 | 14.9 | 15.0 | 15.8 | 15.0 | 16.7 |
| Water | 17.6 | 17.6 | 17.6 | 17.6 | 17.6 | 17.6 |
| Design Air | 2.0 | 2.0 | 2.0 | 2.0 | 2.0 | 2.0 |
| 7 day Compressive Str. | 2592 | 2870 | 3390 | 3369 | 3947 | 3601 |
| 28 day Compressive Str. | 3381 | 3421 | 4315 | 4144 | 4939 | 4655 |

The comparison of maintaining coarse aggregate at 15 vol. % with a constant sand to total aggregate ratio of 0.69 while changing the concrete density shows that as density decreases, the amount of coarse aggregate will eventually be less when the ratio is held constant. For a given comparison, this is the crossover point, which occurs at approximately 120 pcf in this Example 5. Comparing the CV and CR concrete samples at 120 pcf, the relative amounts of ingredients are similar, as are the compressive strengths. As the density is increased to 125 and 130 pcf, more coarse aggregate is present in the CR samples than the CV samples. Surprisingly though, the CV samples exhibit higher compressive strengths than the CR samples. Thus, the mix designs according to the present invention, where sand and prepuff particles replace coarse aggregate at a given density above the crossover point exhibit higher compressive strength values.

Example 6

The following example demonstrates the methods according to the present invention in a pre-cast concrete formulation. The ingredients were combined in 1.25 ft$^3$ batches in a concrete mixer at various sand to total aggregate ratios at about 120 pcf. The prepuff particles had a bulk density of 1.4 lb/ft$^3$ available as ELEMIX® XE concrete additive from NOVA Chemicals Inc., Pittsburgh, Pa. The cement was Lehigh type I cement, sand meeting ASTM C33, the coarse aggregate was no. 7 Limestone, and Glenium® 7500 high range water reducer was used at a water to cement ratio of 0.40. Compressive strengths were measured at 7 and 28 days. The data are shown in the table below.

|  | Sample No. | | |
|---|---|---|---|
|  | W | X | Y |
| Slump Flow (in) | 18 | 17 | 17 |
| Corrected Air (%) | 6.1 | 7.1 | 6.4 |
| HRWR Batched (mL) | 55 | 50 | 45 |
| Wet Density (pcf) | 120 | 119 | 120 |
| Sand/Total Aggregate Ratio | 0.61 | 0.54 | 0.47 |

-continued

|  | Sample No. | | |
|---|---|---|---|
|  | W | X | Y |
| Cubic Yard Mix (lbs/yd$^3$) | | | |
| Cement | 752 | 752 | 752 |
| Sand | 1327 | 1177 | 1027 |
| EPS | 9.8 | 9.9 | 9.9 |
| Coarse Aggregate | 850 | 1000 | 1150 |
| Water | 301 | 301 | 301 |
| VOLUME % | | | |
| Cement | 14.2 | 14.2 | 14.2 |
| Sand | 30.8 | 27.3 | 23.8 |
| EPS | 13.9 | 13.9 | 14.0 |
| Coarse Aggregate | 19.3 | 22.7 | 26.1 |
| Water | 17.9 | 17.9 | 17.9 |
| Design Air | 4.0 | 4.0 | 4.0 |
| 7 day Compressive Str. | 3783 | 3471 | 3206 |
| 28 day Compressive Str. | 4877 | 4712 | 4550 |

The data show that pre-cast concrete mix designs follow the same trend shown above for ready-mix concrete where compressive strength decreases with increasing coarse aggregate loading at relatively constant concrete density.

Example 7

The following example demonstrates the methods according to the present invention in a self-consolidating pre-cast concrete formulation. The ingredients were combined in 2 and 4 yd$^3$ batches in a concrete mixer at two different loadings of coarse aggregate resulting in concrete of 116 lb/ft$^3$. The prepuff particles had a bulk density of 3.4 lb/ft$^3$ (mean particle size of 0.88 mm, aspect ratio of approximately 1 and a smooth polystyrene outer surface). The cement was type III Portland cement, fine sand meeting with a Fineness Modulus (FM) of 1.6, the coarse aggregate was 89 stone, and Glenium® 3400 high range water reducer was used. The water to cement ratio was from 0.34 to 0.36. Compressive strengths were measured at 48 hours. The data are shown in the table below.

|  | Sample No. | | |
|---|---|---|---|
|  | Z | AA | AB |
| Slump Flow (in) | 14 | 16 | 12 |
| Corrected Air (%) | 6.4 | 5.6 | 6.2 |
| HRWR Batched (oz/cwt) | 6 | 8 | 8 |
| Wet Density (pcf) | 116 | 116 | 116 |
| Sand/Total Aggregate Ratio | 0.70 | 0.78 | 0.81 |
| Water/Cement Ratio | 0.34 | 0.36 | 0.35 |
| Batch Size (yd$^3$) | 2 | 2 | 4 |
| Cubic Yard Mix (lbs/yd$^3$) | | | |
| Cement | 873 | 873 | 878 |
| Sand | 1460 | 1310 | 1620 |
| EPS | 23 | 23 | 23 |
| Coarse Aggregate | 620 | 440 | 390 |
| Water | 297 | 310 | 307 |
| VOLUME % | | | |
| Cement | 16 | 16 | 17 |
| Sand | 33 | 36 | 37 |
| EPS | 15 | 15 | 15 |
| Coarse Aggregate | 14 | 10 | 9 |
| Water | 18 | 18 | 18 |
| Design Air | 4 | 5 | 4 |
| 48 hour Compressive Str. | 4380 | 4960 | 5205 |

The data show that self-consolidating pre-cast concrete mix designs follow the same trend shown above for ready-mix concrete where compressive strength decreases with increasing coarse aggregate loading at relatively constant concrete density. Examples Z and AA illustrate the difference in volume %, while example AB shows the successful scale up of the stronger mixture. This mixtures were performed in a plant setting and show the laboratory trends to hold in a commercial environment.

Example 8

The following example demonstrates the methods according to the present invention in concrete grout mix designs, where all of the coarse aggregate has been replaced with prepuff particles and sand. The ingredients were combined in 1.25 ft$^3$ batches in a concrete mixer. The prepuff particles had a bulk density of 1.4 lb/ft$^3$ available as ELEMIX® XE concrete additive from NOVA Chemicals Inc., Pittsburgh, Pa. The cement was Lehigh type I cement, sand meeting ASTM C33, fine sand meeting with a FM of 1.6, and Chryso® 203 high range water reducer was used at the indicated water to cement ratio. Compressive strengths were measured at 7 and 28 days. The data are shown in the table below.

|  | Sample No. | |
|---|---|---|
|  | AC | AD |
| Corrected Air (%) | 4.9 | 3.7 |
| HRWR Batched (mL) | 87 | 190 |
| Wet Density (pcf) | 88 | 89 |
| Water/Cement Ratio | 0.44 | 0.40 |
| Cubic Yard Mix (lbs/yd$^3$) | | |
| Cement | 850 | 900 |
| ASTM 33 Sand | 592 | 574 |
| Fine Sand | 592 | 574 |
| EPS | 21.2 | 21.7 |
| Water | 374 | 360 |
| VOLUME % | | |
| Cement | 16 | 17 |
| ASTM 33 Sand | 13.4 | 12.9 |
| Fine Sand | 13.3 | 12.9 |
| EPS | 28.6 | 29.3 |
| Water | 22.2 | 21.4 |
| Design Air | 6.5 | 6.5 |
| 7 day Compressive Str. | 1840 | 2030 |
| 28 day Compressive Str. | 2210 | 2530 |

Taking all of the examples into account, the data show a consistent trend where compressive strength decreases with increasing coarse aggregate loading at constant concrete density. The trend was the same regardless of the concrete density or the coarse aggregate type. The data also show a variation in strength from the different types of coarse aggregate. In all cases, the river rock yielded the highest strengths. Not wishing to be bound to any particular theory, there are some differences between river rock and other aggregates. One difference is that the river rock was a smooth rounded material versus the crushed angular nature of the limestone and granite. In addition, the river rock material had the highest saturated surface dry (SSD) value among the coarse aggregates. Also, at all concrete densities the 67 limestone acquired the lowest strengths between the types. In general, the compressive strengths increased with increasing concrete density.

The present invention has been described with reference to specific details of particular embodiments thereof. It is not intended that such details be regarded as limitations upon the scope of the invention except insofar as, and to the extent that, they are included in the accompanying claims.

What is claimed is:

1. A method of preparing a light weight concrete composition using expanded polymer particles comprising:
    a) replacing from about 10 to about 50 volume percent of the coarse aggregate in the concrete composition with prepuff particles; and
    b) preparing the concrete composition by combining ingredients comprising 3-40 volume percent cement, 1-50 volume percent fine aggregate having a fineness modulus of less than 4, 0-40 volume percent coarse aggregate having a fineness modulus of greater than 4, 10-22 volume percent water, and 5-40 volume percent of prepuff particles;
    wherein the prepuff particles have an average particle diameter of from 0.2 mm to 5 mm, a bulk density of from 0.02 g/cc to 0.56 g/cc, an aspect ratio of from 1 to 3;
    wherein the concrete composition has a density of from about 1.4 to about 2.1 g/cm$^3$; and
    wherein after the concrete composition is set for 28 days, has a compressive strength of at least 126 Kg/cm$^2$ as tested according to ASTM C39.

2. The method according to claim 1, wherein the prepuff particles have a continuous outer layer.

3. The method according to claim 1, wherein the prepuff particles comprise expanded polymer particles having an inner cell wall thickness of at least at least 0.15 µm.

4. The method according to claim 1, wherein the particles comprise expanded polymer particles comprising one or more polymers selected from the group consisting of homopolymers of vinyl aromatic monomers; copolymers of at least one vinyl aromatic monomer with one or more of divinylbenzene, conjugated dienes, alkyl methacrylates, alkyl acrylates, acrylonitrile, and/or maleic anhydride; polyolefins; polycarbonates; polyesters; polyamides; natural rubbers; synthetic rubbers; and combinations thereof.

5. The method according to claim 1, wherein the prepuff particles comprise expanded polymer particles prepared by expanding a polymer bead having an unexpanded average resin particle size of from about 0.2 mm to about 2 mm.

6. The method according to claim 1, wherein the cement in the concrete composition comprises one or more materials selected from the group consisting of Portland cements, pozzolana cements, gypsum cements, gypsum compositions, aluminous cements, magnesia cements, silica cements, slag cements, Type I cement, Type IA cement, Type II cement, Type IIA cement, Type III cement, Type IIIA cement, Type IV cement and Type V cement.

7. The method according to claim 1, wherein the concrete composition comprises plasticizers and/or fibers.

8. The method according to claim 7, wherein the fibers are selected from the group consisting of glass fibers, silicon carbide, aramid fibers, polyester, carbon fibers, composite fibers, fiberglass, steel fibers, combinations thereof, fabric containing said fibers, and fabric containing combinations of said fibers.

9. The method according to claim 1, wherein the coarse aggregate is selected from the group consisting of stone, gravel, pumice, perlite, vermiculite, scoria, diatomite, expanded shale, expanded clay, expanded slag, pelletized aggregate, tuff, macrolite, slate, expanded blast furnace slag, sintered fly ash, coal cinders, and combinations thereof.

10. The method according to claim 1, wherein the water to cement ratio in the concrete composition is greater than 0.30.

11. The method according to claim 1 comprising combining the sand, coarse aggregate, cement, prepuff particles, water, and optionally a water reducer in a pan or drum type mixer.

12. A method of preparing a light weight concrete composition using expanded polymer particles comprising:
 a) replacing from about 10 to about 50 volume percent of the coarse aggregate, having a fineness modulus of greater than 4, in the concrete composition with prepuff particles;
 b) maintaining a fine aggregate, having a fineness modulus of less than 4, to total aggregate ratio of 0.5 to 0.8; and
 b) preparing the concrete composition by combining ingredients comprising 3-40 volume percent cement, 1-50 volume percent fine aggregate, 0-40 volume percent coarse aggregate, 10-22 volume percent water, and 5-40 volume percent of prepuff particles;
 wherein the prepuff particles have an average particle diameter of from 0.2 mm to 5 mm, a bulk density of from 0.02 g/cc to 0.56 g/cc, an aspect ratio of from 1 to 3;
 wherein the concrete composition has a density of from about 1.4 to about 2.1 g/cm$^3$; and
 wherein after the concrete composition is set for 28 days, has a compressive strength of at least 126 Kg/cm$^2$ as tested according to ASTM C39.

13. A method of preparing a light weight concrete composition using expanded polymer particles comprising:
 (a) selecting a fine aggregate, having a fineness modulus of less than 4, to total aggregate volumetric ratio;
 (b) selecting a target concrete density;
 (c) replacing coarse aggregate, having a fineness modulus of greater than 4, with prepuff particles while maintaining the fine aggregate to total aggregate volumetric ratio to obtain the target concrete density;
 d) preparing the light weight concrete composition by combining ingredients comprising 3-40 volume percent cement, 1-50 volume percent fine aggregate, 0-40 volume percent coarse aggregate, 10-22 volume percent water, and 5-40 volume percent of prepuff particles;
 wherein the prepuff particles replace from about 10 to about 50 volume percent of the coarse aggregate in the concrete mix;
 wherein the fine aggregate to total aggregate ratio is from 0.5 to 0.8;
 wherein the prepuff particles have an average particle diameter of from 0.2 mm to 5 mm, a bulk density of from 0.02 g/cc to 0.56 g/cc, an aspect ratio of from 1 to 3;
 wherein the concrete density is from 1.4 to 2.1 g/cm$^3$; and
 wherein after the concrete composition is set for 28 days, has a compressive strength of at least 126 Kg/cm$^2$ as tested according to ASTM C39.

* * * * *